Nov. 19, 1968 M. K. RICHMOND 3,411,612
LOAD LIMITING POWER TRANSMISSION SYSTEM AND RELATIVE SPEED-CHANGE
Filed June 12, 1964 3 Sheets-Sheet 1
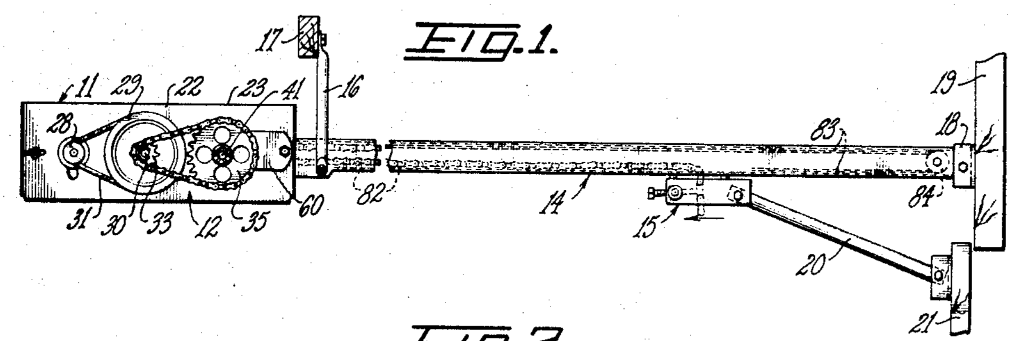
FIG. 1.
FIG. 2.
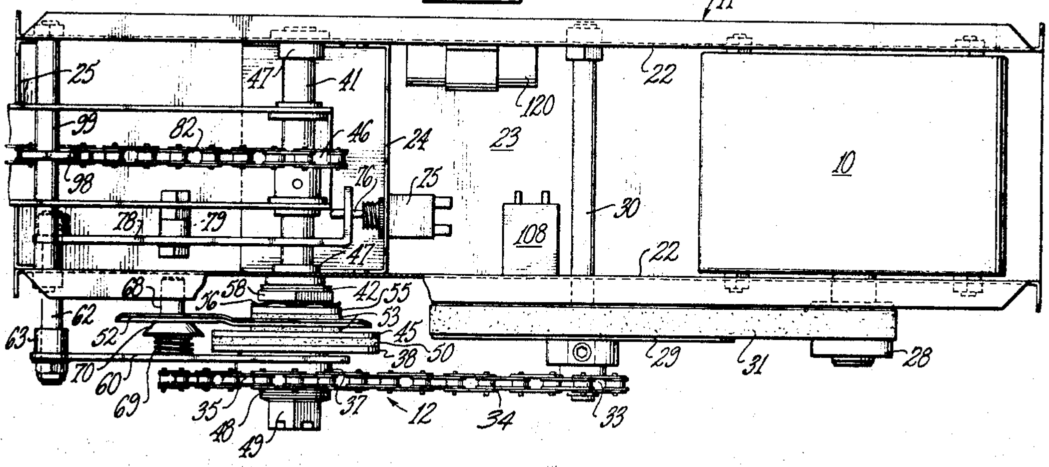
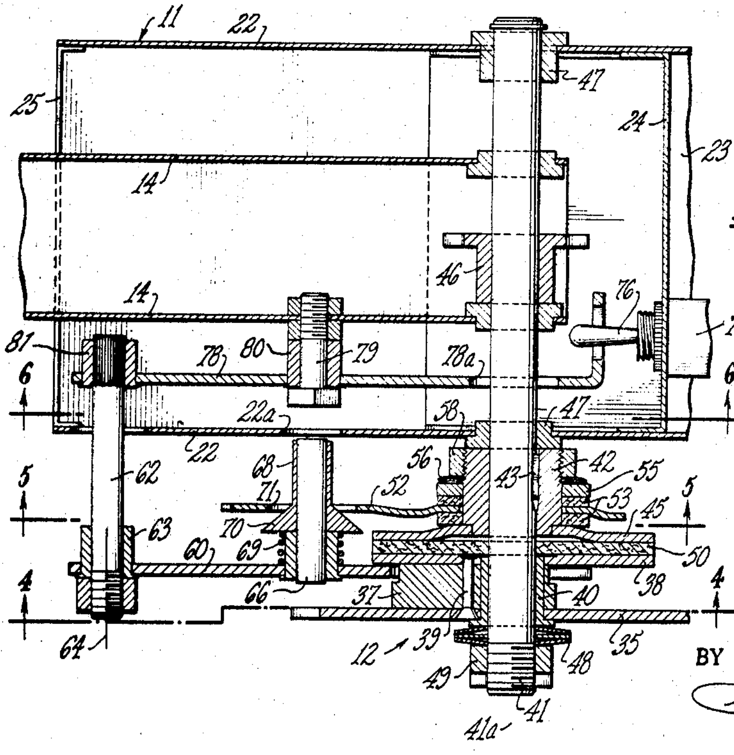
FIG. 3.
MOSCOW K. RICHMOND
INVENTOR.
BY
ATTORNEY Nov. 19, 1968 M. K. RICHMOND 3,411,612

LOAD LIMITING POWER TRANSMISSION SYSTEM AND RELATIVE SPEED-CHANGE

Filed June 12, 1964 3 Sheets-Sheet 2

MOSCOW K. RICHMOND
INVENTOR.

BY [signature]

ATTORNEY

Nov. 19, 1968 M. K. RICHMOND 3,411,612
LOAD LIMITING POWER TRANSMISSION SYSTEM AND RELATIVE SPEED-CHAN E
Filed June 12, 1964 3 Sheets-Sheet 3
FIG. 10.
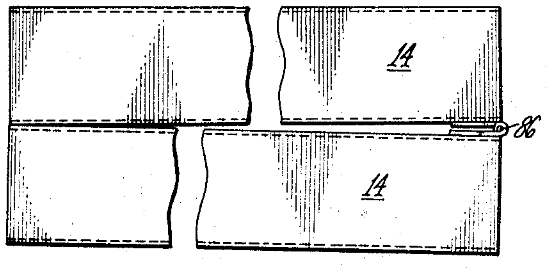
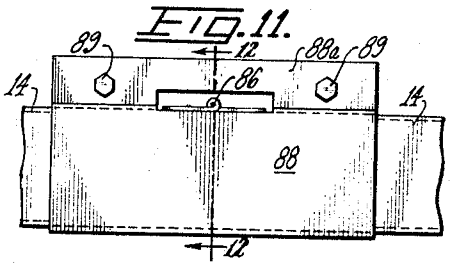
FIG. 12.
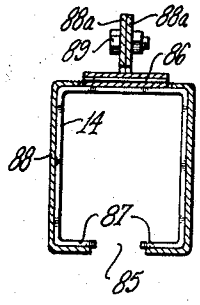
FIG. 13.
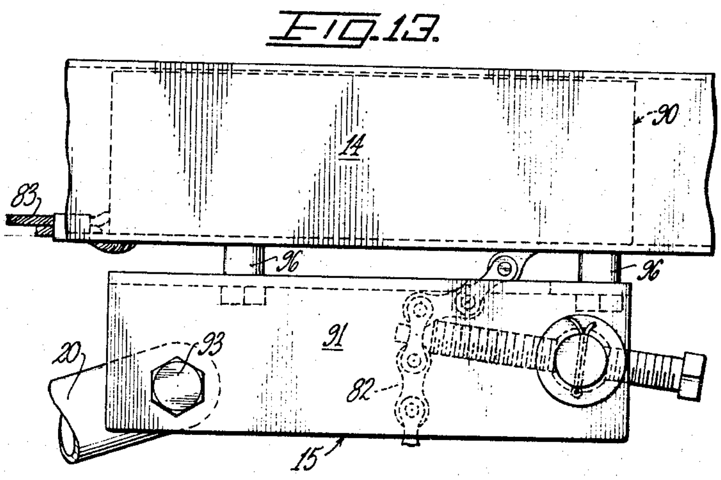
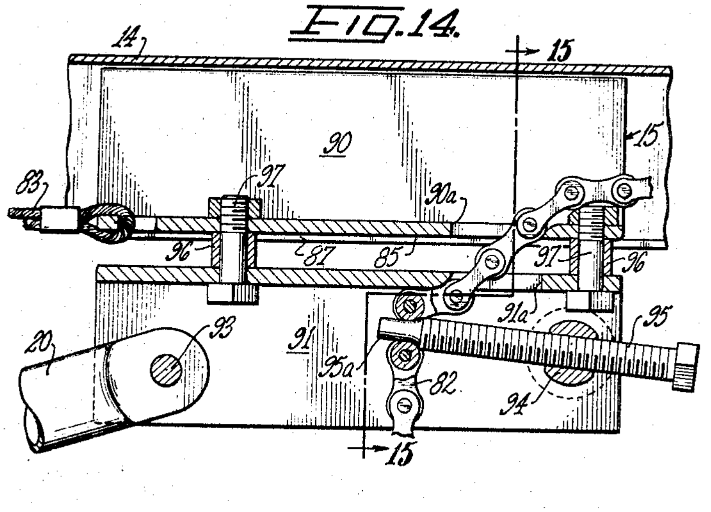
FIG. 15.
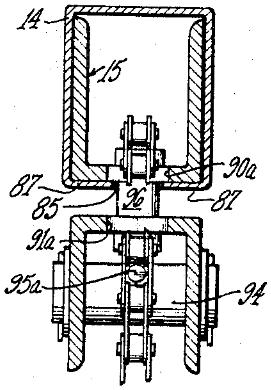
MOSCOW K. RICHMOND
INVENTOR
BY [signature]
ATTORNEY United States Patent Office 3,411,612

Patented Nov. 19, 1968

1

3,411,612

LOAD LIMITING POWER TRANSMISSION SYSTEM AND RELATIVE SPEED-CHANGE

Moscow K. Richmond, 2819 Butler Ave., Los Angeles, Calif. 90064

Filed June 12, 1964, Ser. No. 374,768
16 Claims. (Cl. 192—139)

ABSTRACT OF THE DISCLOSURE

A mechanical load transmission system includes a speed-change sensing device to sense a change in speed or load in case of overload or stoppage of a driven element or reaching a limit stop or the like. The mechanism shuts off power to the prime mover under these conditions and may also reverse the prime mover, particularly when the prime mover is an electric motor, so that the system acts both as a safety mechanism and as a travel limiting mechanism particularly adapted to devices which make repeated excursions back and forth over a given path, as for example a door operating mechanism.

The present invention in its broader aspects relates to a speed-change sensing mechanism, and especially a mechanism for sensing changes in the relative speed of a rotary member caused by an overload or stoppage of the work, which reduces the speed of the rotary member. In its more specific aspects, and as an example of an application of the speed-change sensing mechanism, the invention is related to a door operator in which the sensing mechanism automatically shuts off the electric motor which supplies the power for operating the door, thus automatically shutting off the power at each end of the travel of the door.

In general, a typical application of the present speed-change sensing mechanism is sensing overloads or stoppages in a mechanical power transmission system. In this system, the sensing mechanism comprises a rotary power transmission member operatively connected in the transmission system in such a way that it is slowed or arrested by an overload in the system. Rocking motion is imposed on an oscillating arm in the speed-change sensing mechanism in response to this slowing or arresting of the driven member of the power transmission system; and this rocking motion of the arm can be utilized to effect a desired control function in the system, for example, to operate a switch which turns off an electric motor or a valve which shuts off fluid flow.

A door operator is but one typical example of a member to be moved back and forth over a given path. Typical known means for controlling the length of travel of such a member are two limit switches that, upon actuation, shut off the power to the motor. Hence the travel is terminated by passing a switch, not by reaching the end of the path; and the latter is to be desired to ensure full excursions. Switches are hard to adjust to obtain full travel and are subject to being knocked out of adjustment.

To assure full excursions of the moving member, systems have been developed in which the motor is stalled at each end of the range of travel and power is thereafter shut off by operation of a thermal relay actuated by a rise in temperature created by the stalled motor. This system uses a safety feature as normal operation and is subject to disorder if the thermal relay fails to open.

The first type of system has the added objection that it has no integral means to stop the door at an intermediate point, as when a foreign object is in the doorway, unless there is added a safety device such as a load-limiting friction clutch or a shear pin; or a thermal relay is

2 opened when the motor overheats. These devices are generally lacking in the desired degree of sensitivity and keep the power on so long that damage or injury can be done to an object or person in the path of the door. For example, a friction clutch used only under emergency conditions often fails to release when needed because the clutch plates adhere to each other from a long continued lack of relative motion. Likewise, various conditions may delay a temperature rise sufficient to operate a thermal relay.

Door operators in common with various power transmission systems have a rotating member turning in synchronism with the door travel. It is apparent that a mechanical reaction to the change in speed of such a rotating member could produce a quicker, more reliable means for controlling the motor and have the advantage of effecting control at any point in the path of the door as well as at the two ends of the normal travel.

Thus it is evident that a general object of the invention is to provide a novel speed-change sensing mechanism for sensing changes in the rotary speed of a member in the power train of a power transmission system.

Another object of the invention is to provide a mechanism of the character described which performs desired control functions in response to speed changes sensed by the mechanism, thus controlling the operation of a prime mover such as an electric motor.

Another object of the invention is to provide a speed-change sensing mechanism which is adapted to sense a reduction in speed of a rotary member occurring in response to an overload or stoppage in the power transmission system.

The specific design of the present speed sensing mechanism is an improvement upon an earlier design in which an oscillating arm is adapted under certain circumstances to be held stationary by friction applied to the arm. Since the friction applying means are in operation at all times, even while the arm is oscillating, the movement of the arm involved substantial wear and an extra load on the motor during all normal operation. Since this condition is undesirable, it is an object of the present improvement in the design to reduce both the wear and the load on the motor while retaining the same general principle of operation.

It is also a general object of the invention to provide a mechanism of the character described which is more compact and efficiently arranged than heretofore and which incorporates design changes which permit full compliance with various building and safety codes while keeping various aspects of the invention substantially unchanged.

These objects of the present invention are achieved by providing, in a door operator, mechanism for sensing a change in the speed of a driven member relative to a driving member, such mechanism comprising a driving and a driven member with a friction clutch between them which permits relative slippage between elements of the clutch whereby a change in relative speed of said members can take place; an eccentric cam with means for rotating said cam, typically the driving member; an operating lever engaging said cam to be rocked thereby; a pair of fulcrums rockably engaging the lever, one of said fulcrums being normally stationary but shiftable between two positions and the other of said fulcrums being on and movable with the lever; and means to hold said other fulcrum fixed in space in order to rock said arm about the now fixed fulcrum and thereby shift the one fulcrum between said positions in response to a decrease in the speed of the driven member relative to the driving member.

The door operator also includes a fixed track along which a carriage is moved by an endless power transmitting member, such as a chain or cable, which is driven by a rotary member whose change in rotational speed is sensed by the speed sensing mechanism. The track is hinged to permit folding and is provided with a bracket to hold the hinged sections extended, said bracket contacting only exterior surfaces of the track so that the carriage, which is guided only by interior surfaces of the track, moves past the bracket freely. The carriage construction includes novel means for adjusting the tension in the chain or other power transmitting means.

A variational embodiment of the present invention is disclosed and claimed in my copending application Ser. No. 193,733 filed May 10, 1962, now Pat. No. 3,233,162, for Rotary Speed-Change Sensing Mechanism, which contains claims generic to both embodiments.

How the above objects and advantages of the present invention, as well as others not specifically referred to herein, are attained will be more readily understood by reference to the following description and to the annexed drawings, in which:

FIG. 1 is a side elevation of a complete door operator constructed according to the present invention with the traveling carriage connected to an overhead type door;

FIG. 2 is an enlarged inverted plan view of the power transmission system but revolved right for left for purposes of illustration, including the speed-change sensing mechanism and the control means for controlling operation of the electric motor;

FIG. 3 is a further enlarged fragmentary horizontal section through the speed-change sensing mechanism at the center line of the drive shaft;

FIG. 10 is a side elevation of the track in folded position, portions of the track being broken away;

FIG. 11 is a fragmentary side elevation of the track in extended position showing the bracket in place for holding the track sections extended;

FIG. 12 is a transverse cross-section on line 12—12 of FIG. 11;

FIG. 13 is a fragmentary side elevation of the track and carriage traveling thereon;

FIG. 14 is a vertical median section through a portion of the track and the carriage traveling thereon; and FIG. 15 is a vertical transverse section through the track and carriage on line 15—15 of FIG. 14.

Figure 4:
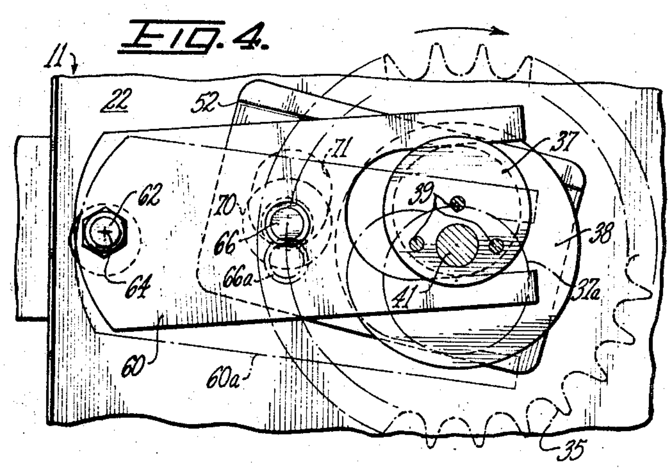
FIG. 4 is a fragmentary side elevation and vertical section of the speed-change sensing mechanism on line 4—4 of FIG. 3 as the door is opening.

Referring now to the drawings, and particularly to FIG. 1, it will be seen that the door operator comprises a prime mover, preferably electric motor 10, mounted on a skeleton frame 11, a power transmission system indicated generally at 12 and including the mechanism for sensing a change in speed, and a track 14 along which travels carriage 15. The operator may be mounted in any suitable manner, as by attaching hanger 16 near one end of the track to a structural member of the building as at 17, while the other end of the track is attached by bracket 18 to the wall or lintel 19 over the doorway. Traveling carriage 15 is connected by link 20 to door 21 which is to be raised and lowered by movement of the carriage, door 21 being here shown as of the overhead type although it will be realized that the construction of the door and the path through which it moves to open and close are not limitative upon the present invention.

Considering first the power transmission system, which is shown in FIGS. 2 and 3, it will be seen that frame 11 comprises a pair of parallel side plates 22 strengthened by outstanding flanges along their bottom edges and interconnected by a top transverse wall 23 as well as a plurality of transversely extending braces 24 and 25. Track 14 extends into and is secured to frame 11 in any suitable manner. Motor 10 is shown in FIG. 2 as mounted on and between the two side plates 22. For reasons which will become apparent, motor 10 is of a reversible type, but otherwise the motor may be of any suitable design.

Referring particularly to FIG. 2, it will be seen that the output shaft of motor 10 has mounted on it a small drive pulley 28 which drives a larger pulley 29 mounted on shaft 30, by means of belt 31 trained around pulleys 28 and 29. Shaft 30 also carries a small drive sprocket 33 which drives roller chain 34 passing over sprocket 33 and larger sprocket 35, which latter sprocket serves as the driving or input member to the mechanism for sensing the change in relative speed, as will be explained. The diameters of the several pulleys and sprockets are so chosen as to effect a desirable speed reduction between the output shaft of motor 10 and the final drive for imparting motion to carriage 15.

Referring now to FIG. 3, the speed-change sensing mechanism comprises a driving assembly which includes the drive sprocket 35, eccentric type cam 37, and disc 38. These three elements are fastened together into a unitary assembly, by a plurality of rivets 39 or other suitable means, that is rotatably mounted by journal bearing sleeve 40 to turn on and about shaft 41.

The mechanism for sensing the change in relative speed also includes a driven assembly comprising shaft 41, hub 42 keyed to the shaft at 43, disc 45 non-rotatably attached to hub 42, and output sprocket 46 pinned to the shaft. Shaft 41 is mounted to rotate about a fixed axis 41*a* in journal bearings 47 mounted in the side plates of the frame. A driving connection is established between the driving and driven assemblies as just described by means of a first friction clutch 50. This friction clutch comprises a friction disc loosely mounted on shaft 41 between opposing parallel faces of discs 38 and 45 of the driving and driven assemblies, respectively. Thus as driving disc 38 rotates, it transmits power and rotational motion, through its frictional contact with the disc 50, to the driven disc 45 and the other elements of the driven assembly; but because of the frictional nature of the engagement between the three discs, relative motion or slippage between these clutch discs is possible, for reasons which will be further explained later. The interface pressure between the discs is established and regulated by spring washers 48 held by adjusting nut 49 against the end of bearing sleeve 40. The driving torque transmitted through clutch 50 is adjusted by movement of nut 49 to adjust the axially directed force exerted by spring washers 48 on the clutch. One result of this construction is to limit the load that can be accepted by the system or, differently stated, to establish the torque at which the elements of the clutch slip relative to each other.

Arm 52 is mounted on hub 42 in a manner to swing around shaft 41 and to permit relative rotational motion between the arm and the driven assembly. A second friction clutch means continuously urges arm 52 to rotate with shaft 41. These clutch means comprise a pair of friction discs 53 mounted one on each side of arm 52 and surrounding hub 42. To accommodate these discs, the arm is made of flat sheet metal so that the end of the arm resembles a disc. The central opening through the arm is larger than hub 42, while the portion of the arm immediately surrounding this central opening is slightly offset, as shown in FIG. 3, whereby the two friction discs 53 exert a centering action on the arm to prevent contact between the arm and hub 42. It will be noted that one of the discs 53 is interposed between driven disc 45 and arm 52, and it is the frictional engagement of these three members which transmits from disc 45 a driving torque tending to rotate arm 52 around the axis of shaft 41 during rotation of the shaft and parts attached thereto.

In order to maintain an adjustable axial pressure between the friction elements 53, arm 52 and disc 45, there is provided a washer 55 bearing against the outside friction element. Axially directed pressure is applied against the washer by spring washers 56 and is controlled in magnitude by lock nut 58 threaded onto hub 42.

The main operating lever 60 of the mechanism is shown in both FIGS. 3 and 4. It is a flat plate which is forked or slotted at one end to receive a cylindrical portion of eccentric cam 37. The diameter of the cylindrical portion of the cam and the width of the slot are substantially equal so that the lever spans the cam and is supported thereby, and also is oscillated upon rotation of the cam, as will become evident.

The operating lever 60 is rockably engaged by two spaced fulcrums. The first of these fulcrums is rod 62 which passes through and is rotatably mounted in bushing 63 which is riveted or otherwise suitably attached to lever 60 at the end thereof remote from eccentric 37. Rod 62, acting as the first fulcrum, establishes axis 64 as the axis about which lever 60 is normally rocked by the action of eccentric cam 37 during the travel of carriage 15, as will be explained. Axis 64 is normally stationary, but it will be seen that this axis is shiftable between two positions, the axis being normally stationary in either one of these two positions.

A second fulcrum about which lever 60 can be rocked is that provided by pin 66 which is mounted on the lever at a position between the first fulcrum 62 and eccentric 37. As a consequence, during the oscillation of lever 60 about axis 64, fulcrum 66 also oscillates.

In order to rock lever 60 about fulcrum 66, means are provided for holding fulcrum 66 fixed in space in order to cause the lever to rock about the second fulcrum and thereby shift axis 64 from one position to the other. The last-mentioned means comprise sleeve 68 slidably mounted on pin 66 and biased away from lever 60 by coil spring 69 which is wrapped around the bushing mounting the fulcrum pin on the lever. The inner end of sleeve 68, that is, the end closer to lever 60, is provided with a conical cam 70, one end of which provides a face against which spring 69 bears to urge the sleeve and cam outwardly along fulcrum pin 66 away from arm 60.

Figure 8:
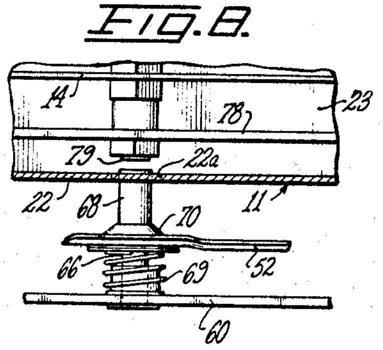
FIG. 8 is a fragmentary horizontal section on line 8—8 of FIG. 7.

As shown in FIGS. 3 and 8, fulcrum pin 66 and sleeve 68 project through an oval opening 71 in swinging arm 52. Pin 66 stops short of frame side plate 22; but when the sleeve is pushed outwardly on the fulcrum pin, the sleeve can enter an opening 22*a* in the side plate, as shown in FIG. 8. The result is that the sleeve acts as an extension of the fulcrum pin, causing the fulcrum to engage side plate 22, which is stationary, thus arresting oscillatory motion of the fulcrum.

As arm 52 swings about the axis of shaft 41, one side of opening 71 in the arm engages the sloping face of cam 70, forcing sleeve 68 inwardly along the fulcrum pin in opposition to spring 69 and retracting the slidable sleeve to the position of FIG. 3 in which fulcrum 66 is free to oscillate with arm 60.

In this door operator, the prime mover is electric motor 10. Operation of the motor is controlled by electric switch 75 which, for compliance with safety codes and regulations, is mounted on transverse member 24 with the switch located in a compartment within the frame containing motor 10 and other electrical equipment. However, the toggle arm 76 which operates the switch extends to the other side of frame member 24, as shown particularly in FIG. 3. Since it is desired to have switch 75 actuated by the speed sensing mechanism, a second operating lever 78 is provided. This lever is pivotally mounted at some point between its ends on bolt 79 by a bearing sleeve 80 attached to lever 78. The bolt, in turn, is mounted on one wall of the channel-shaped track 14 where it extends into the enclosure provided by frame 11. Fulcrum rod 62 is connected to the second operating lever by means of bushing 81 suitably attached to the rod and to the lever. Lever 78 extends toward switch 75. The end of the lever is bent at right angles to the main portion of the lever and slotted to receive toggle handle 76 in such a manner that the toggle can be moved between its alternate positions by rocking lever 78 about pivot 79. Lever 78 has an opening 78*a* through which shaft 41 passes, the opening being of sufficient dimension that this rocking motion of the lever can occur without interference from shaft 41.

Sprocket 46 on shaft 41 is the output member of the power train so far described. Sprocket 46 has trained over it roller chain 82 (FIG. 2) which is a part of a flexible endless power transmitting member connected to carriage 15 to move the carriage along track 14. A chain and sprocket are preferred for the driving end of this endless member because of the positive drive characteristics provided thereby. While the entire endless element may be a roller chain, it is preferred to have only that portion of the element which passes over the drive sprocket a chain, the remainder being a length of steel cable 83 or the like, as shown in FIG. 13. This cable portion passes over idler pulley 84 (FIG. 1), the free end of cable 83 being anchored to the forward end of carriage 15, as shown in FIG. 13. The free end of chain 82 is also attached to carriage 15, as shown in FIGS. 13 and 14. With the endless member attached to the carriage so that the carriage is in effect a part of the endless member, the carriage can be pulled in either direction along track 14.

Track 14 is a tubular member with a longitudinally extending slot along one side. This slot, indicated at 85 in FIG. 12, is located at the underside of the track and extends for substantially the full length of it. Track 14 is a common type of channel member with inwardly turned flanges 87 along the two sides of slot 85 and is normally rectangular in cross-section. However, tubular members of other shapes may be employed if desired; but the rectangular shape is preferred since it gives the greatest stability to movement of the carriage.

Track 14 is normally several feet long. In order to facilitate shipment of this long member, it is divided into two more or less equal sections which are hinged together by an externally located hinge, as at 86 in FIGS. 10 and 11. Hinge 86 permits the track sections to be folded on one another into side-by-side relation as shown in FIG. 10 for shipping, and to be extended into prolongation of each other to form a continuous track as shown in FIG. 11. To hold these two track sections in the extended position, clamp 88 is provided. Clamp 88 consists of two sections conforming in size and shape to the exterior surface of the tubular track and which have opposed mating flanges 88*a* through which pass bolts 89 to fasten together the two halves of the clamp. Clamp 88 engages the abutting ends of the two track sections to hold them rigidly in position to provide, in effect, a single continuous track. It will be noted that the clamp engages only outer surfaces of the tubular track and does not cross slot 85. Thus the clamp does not come into contact with carriage 15 which, as will be explained, engages the internal surfaces of the track.

Carriage 15 which travels along track 14 is shown in detail in FIGS. 13, 14 and 15. Generally speaking, it comprises two sections, a guiding and supporting section that is contained inside the channel forming track 14 and an outside section to which chain 82 and operating link 20 are connected. In the preferred embodiment illustrated in the drawings, these two sections 90 and 91, respectively, are shown as being channel-shaped in cross-section and both alike in size and shape. However, this is for convenience only and it is not necessary that the two sections be similar.

Section 90 which rides inside track 14 has an exterior surface which conforms in size and shape to the interior surface of track 14 in order that the track is most efficiently supported and guided as the carriage slides along the interior surface of the track. The same general configuration for the outside section 91 is convenient as it provides depending legs receiving bolt 93 by which connecting link 20 is pivotally connected to the carriage. The two depending legs of channel section 91 also provide a convenient arrangement for receiving a transversely extending trunnion 94 through which passes adjusting screw 95. Screw 95 is threaded into the trunnion and has the forward end reduced in diameter at 95*a* to be inserted between the side plates of the roller chain, as shown in FIG. 15. This forward tip 95*a* of reduced diameter provides a shoulder on the screw which engages the chain links to provide a thrust as the adjusting screw is tightened. Chain 82 passes through openings 90*a* and 91*a* in the two track sections, respectively, to engage adjusting screw 95. The angularity of the path followed by the chain brings the chain into firm contact with one edge of opening 91*a* and thus ensures not only that the chain is held tight by adjusting screw 95 but that the chain is locked on the forward end of the adjusting screw and cannot jump off. The length of the threaded portion of screw 95 is preferably equal to two or three links of the chain so that adequate range of movement is provided on the adjusting screw to provide the proper tension in the endless member 82–83.

The two sections 90 and 91 of the carriage are held spaced apart by tubular spacers 96 through which pass bolts 97 to fasten the two sections together. Spacers 96 pass through the longitudinal slot in the bottom of the track and hold the exterior portion of the carriage free of the exterior surface of the track, thus allowing the carriage to move back and forth along the track while clearing clamp 88 at the joint in the track. From this arrangement, it will be seen that the carriage is supported and guided solely by interior surfaces of the track while spacers 96 merely provide posts connecting the exterior portion of the carriage to the interior guiding portion.

Long unsupported runs of chain have a tendency to vibrate, especially when driven by a sprocket of relatively small diameter, as at 46. This vibration can be substantially eliminated by a vibration dampening means in the form of a narrow metal shoe 98 on crossbar 99. The shoe is stationary and bears lightly against the moving rollers on the lower run of chain 82, as shown in FIG. 2. The shoe is spaced from sprocket 46 a short distance. The upper run of the chain carries a rubber grommet (not shown) which slides over the inside surface of track 14 to dampen vibration of that run.

Figure 9:
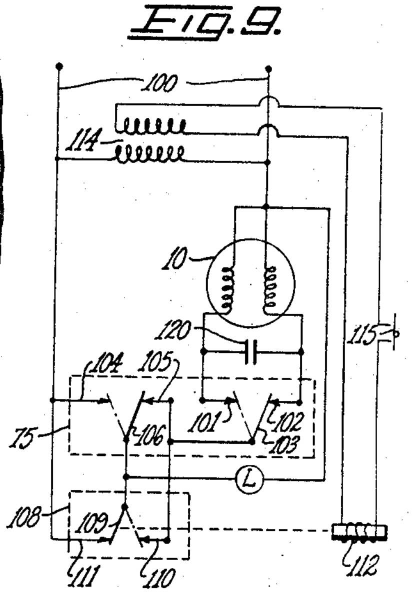
FIG. 9 is a wiring diagram of the control circuit.

The electrical circuit for the door operator is shown by the wiring diagram of FIG. 9. Electrical power is supplied from any suitable source, for example, the usual domestic 110 volt, 60 cycle supply, by a pair of conductors 100. Motor 10 is of the reversible type and has two stator coils which are connected in parallel to one of conductors 100, with capacitor 120 connected across the stator coils. The coils of the motor are respectively connected to fixed contacts 101 and 102 of switch 75. These two fixed contacts cooperate with movable contact 103 to provide a single-pole, double-throw switch. Switch 75 may be considered as comprising two such single-pole, double-throw switches, the other of which comprises fixed contacts 104 and 105 which cooperate with movable switch contact 106. Movable contact 103 of the first switch is connected to fixed contact 105 of the second switch. Fixed contact 104 of the second switch is connected to the other supply conductor 100 while the movable contact 106 of this switch arrangement is connected to movable contact 109 of relay 108.

Relay 108 likewise includes a single-pole, double-throw switch comprising a pair of fixed contacts 110 and 111 cooperating with movable contact 109. Contact 110 is connected to fixed contact 105 and movable contact 103 while the opposite fixed contact 111 is connected to the second supply conductor 100, the same as contact 104. The movable contact 109 is shifted in position by energizing relay coil 112 which is energized by low voltage current derived from the secondary of transformer 114. The primary of transformer 114 is connected across the two supply conductors 100. In series with relay coil 112 and the transformer secondary is manual push button 115 which is typical of means normally provided for energizing coil 112 in order to operate the door operator. There may be provided in parallel with, or in lieu of, push button 115 other switching means which are operated mechanically or by radio controlled means; but such additional circuit components do not modify the operation of the circuit and form no part of the present invention.

The single-pole, double-throw switches indicated in the wiring diagram are all of the snap-action or over-center type in which the movable contacts are spring biased into engagement with one or the other of the two fixed contacts with which they cooperate. The movable contacts 103 and 106 of switch 75 are ganged together so that when switch lever 76 is moved between positions 76 and 76*a*, the movable contacts are moved from the solid line to the dotted line position shown in FIG. 9. Similarly successive energizations of relay coil 112 shift movable contact 109 between the full line and dotted line positions, but the switch is normally closed in one position or the other.

Assume that the movable contacts all occupy the solid line positions as shown in the wiring diagram. The circuit is now completed from one of the two supply conductors 100 through the motor coil driving the motor in a forward direction and then in succession through contacts 102, 103, 105, 106, 109, and fixed contact 111 to the other supply conductor. At the end of the door movement in the opening direction, switch lever 76 is moved as will be explained to the alternate position 76*a*, thus shifting contacts 103 and 106 to the dotted line positions and opening the circuit through motor 10. The motor is now de-energized and so remains until, by pressing push button 115, relay coil 112 is energized. This moves contact 109 into engagement with contact 110. Now the circuit is completed through the other motor stator coil, thereby driving the motor in the reverse direction, in succession through fixed contact 101 and movable contact 103 of switch 75, to contacts 110 and 109 of relay 108 and thence through contacts 106 and 104 of switch 75 to the other supply conductor. At the end of the reverse movement closing door 21, it will be seen that the movement of switch arm 76 back to the solid line position of FIG. 6 again opens the circuit through the motor and de-energizes the motor by shifting movable contacts 103 and 106 together to the alterntae solid line positions shown.

Having described above the construction of the improved door operator, its operation will now be set forth. Referring to FIG. 4, it is assumed that the motor is on and is driving the main sprocket 35 in a clockwise direction which moves carriage 15 to the left in FIG. 1 and opens door 21. This movement being in the direction to open the door is herein referred to as the forward direction, whereas the movement of the parts in the direction to close the door is also referred to as the reverse direction.

Rotation of the driving assembly including main sprocket 35 causes cam 37 to rotate about the axis of shaft 41 between the two extreme positions shown in solid and dotted lines in FIG. 4 at 37 and 37*a*, respectively. This rotational or gyratory motion of the cam oscillates lever 60 about the first fulcrum established by rod 62. The axis 64 is normally stationary and is in the upper of the two positions normally occupied by it. Oscillatory motion of lever 60 is between the upper full line position and the lower broken line position 60*a* in FIG. 4.

Being mounted on arm 60, it is apparent that the second fulcrum 66 also oscillates with arm 60 between the two positions shown in FIG. 4, the range or amplitude of motion of the second fulcrum being, of course, proportionally less than the eccentricity of cam 37. The second fulcrum is free to oscillate because the slidable member 68 is held in the retracted position shown in FIG. 3 by the action of the parts now to be described. It will be remembered that rotational movement is imparted from disc 38 to disc 45 through the friction clutch at 50, thus driving the driven assembly which includes output sprocket 46. During this rotational movement of the driven assembly, disc 45 exerts a torque on arm 52 through the intervening friction element 53 which tends to turn the arm in the same direction with shaft 41. As a result, arm 52 is rotated clockwise until it engages conical cam 70 and, by engagement therewith, forces sleeve 68 to the retracted position as the shaft starts to turn.

Fulcrum 66 being fixed to arm 60, the clockwise motion of arm 52 ceases when it firmly engages sleeve 68 and fulcrum 66 so that slippage then occurs between the arm and friction elements 53, although the continuously applied torque biases arm 52 in a clockwise direction. The result is to maintain a continuous contact between the arm and cam 70, during rotation of shaft 41 and the parts attached thereto, which maintains sleeve 68 in the retracted position.

Because of the continuous application of biasing torque to arm 52, the arm follows the cam in contact therewith as the second fulcrum moves upwardly during one-half of its oscillatory travel. As the fulcrum moves downwardly to position 66*a* during the following half of each oscillatory cycle, arm 52 is forced to follow the second fulcrum so that the arm rotates a short distance counterclockwise from the position shown in full lines in FIG. 4. This is possible because of the slippage occurring between it and the frictional elements applying torque to it.

These conditions are created by the mutual rotation of the driving and driven assemblies, and more particularly the cam 37 and driven disc 45; and these conditions prevail as long as both assemblies are turning at the same rate. However, in response to a substantial decrease in speed of the driven assembly relative to the driving assembly causing a slippage between discs 38 and 45 and the friction elements carried thereon, such as might result from a severe overload or a stoppage of the door, either because it had reached the end of the normal travel or some obstacle was in the way, a series of events takes place in the mechanism sensing the change in relative speed of the rotating parts which shuts off the power to motor 10. This series of events will now be described.

Assume now that door 21 stops moving, as is the case when it reaches the full open position at the end of its normal range of travel. Because of the positive driving connection between the door and sprocket 46, sprocket 46 stops rotating, as do all other connected elements of the driven assembly and particularly clutch disc 45. When disc 45 ceases to rotate in the assumed clockwise direction, there is no longer any torque imparted to arm 52 to bias it in a clockwise direction. However, the slippage between clutch elements 38 and 45 allows members to the driving assembly, including sprocket 35, to continue to move. If the biasing torque ceases during upward movement of fulcrum 66, during the next downward movement of fulcrum 66 from the solid line position to the position 66*a* in FIG. 4, rotation of arm 52 counterclockwise is effected through engagement with the fulcrum. This movement of the fulcrum takes place because, even though disc 45 stops rotating, power is still being applied to the driving assembly and sprocket 35 and eccentric 37 continue to rotate thereby rocking arm 60.

Figure 5:
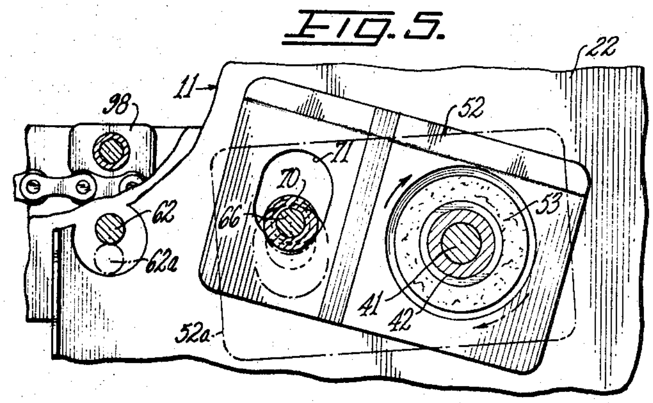
FIG. 5 is a fragmentary vertical section on line 5—5 of FIG. 3.

This continued rotation of eccentric 37 next causes fulcrum 66 to move upwardly through the second half of its oscillation cycle, returning to the full line position of FIG. 4. However, the lack of any biasing torque on arm 52 causes arm 52 to remain in what may be referred to as its lowered position. As a consequence, the upward movement of the cam and sleeve carried by fulcrum 66 disengages these members from arm 52 and they slide outwardly along pin 66 under the influence of spring 69. As a consequence, the sliding member on the fulcrum now enters opening 22*a* in the frame side plate, reaching the position shown in FIG. 8 in which continued upward movement of the fulcrum brings it into engagement with the side plate at the upper edge of opening 22*a*. The sliding movement of sleeve 68 on pin 66 is limited by engagement of conical cam 70 with the edge of opening 71 as the cam is larger than the opening and cannot pass through it. The frame side plate now acts as a fixed stop which, upon engagement with fulcrum 66, prevents further motion of the fulcrum. As a consequence, lever 60 now rotates about the axis of fulcrum 66 in a counterclockwise direction. This shifts fulcrum 62 from the upper position shown in FIG. 4 to the lower, dotted line position 62*a* in FIG. 5 which is the alternate position occupied by the fulcrum and axis 64.

Figure 6:
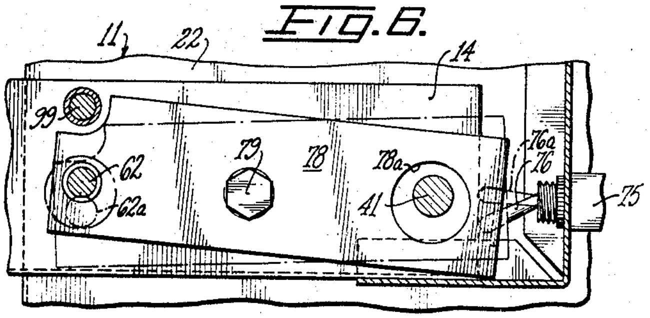
FIG. 6 is a fragmentary vertical section on line 6—6 of FIG. 3.
Figure 7:
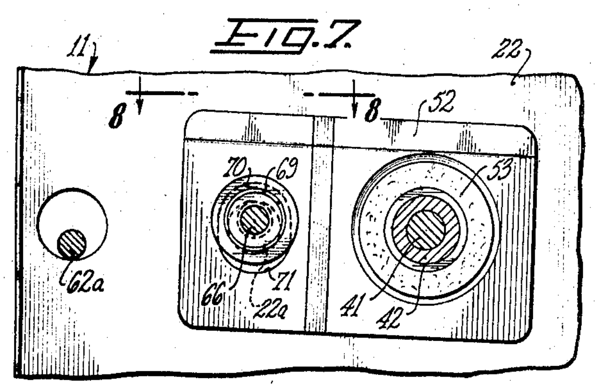
FIG. 7 is a fragmentary vertical section similar to FIG. 5 illustrating alternative positions of one fulcrum and means for holding fixed the other one of the fulcrums.

The downward movement of fulcrum 62 rocks the lower end of the secondary operating lever 78 downwardly, swinging lever 78 in a counterclockwise direction around fixed pivot 79, and raising switch arm 76 from the lower, solid line position of FIG. 6 to the upper, dotted line position 76*a*. This shuts off the power to motor 10. Thus the mechanism sensing the change in relative speed of the driven members, for example sprocket 46 or disc 45, causes the fulcrum 66, which is normally free to oscillate with the operating lever, to be fixed in space, with a result that the operating lever swings around this fulcrum and shifts the first fulcrum 62 between its two alternate positions. This movement of fulcrum 62 is communicated to switch arm 76 to shut off the power to motor 10, all in response to a decrease in the relative rotational speeds of the members 45 and 38.

As explained before, motor 10 is a reversible motor, and relay 108 is of the type that upon each successive energization of coil 112 causes the contact 109 to swing from one alternate position to the other. Consequently, the next time the relay is energized to start motor 10, motor 10 turns in the reverse direction and sprocket 35 is driven in the counterclockwise direction to close door 21. The same sequence of events as just described takes place except that it is modified by the reverse direction of rotation of certain of the elements. During the period of time that carriage 15 is being moved to the right in FIG. 1 to close door 21, sprocket 35 is turning counterclockwise. The rotation of the sprocket rotates eccentric cam 37 and this cam causes lever 60 to oscillate in the same manner as before about the axis of fulcrum 62, now at 62*a*, whereas fulcrum 62 was previously in the upper position shown in FIG. 5. It is now in the lower position 62*a* since, it will be remembered, it was shifted to this position in order to actuate switch lever 76 and remains in that position.

The counterclockwise rotation of sprocket 35 and disc 38, of course, drives disc 45 in a similar counterclockwise direction. This counterclockwise movement of the driven disc imparts a counterclockwise torque to arm 52 which biases arm 52 in a counterclockwise direction so that the arm tends to move to the broken line position 52*a* in FIG. 5. Oscillation of fulcrum 66 moves arm 52 upwardly in a clockwise direction against this normal biasing torque as fulcrum 66 moves upwardly during half of its oscillatory movement, while the normal biasing force on arm 52 then moves it downwardly during the other half of the oscillatory movement of fulcrum 66. This oscillatory movement of the fulcrum and of arm 52 continues during the travel of carriage 15 outwardly along track 14.

At the end of the movement opening door 21, sleeve 68 sliding on fulcrum 66 had been extended by the action of spring 69 to engage the fixed stop provided by side plate 22. However, at the beginning of the new operating cycle, the counterclockwise biasing torque applied to arm 52 swings arm 52 into contact with the inclined surface of cam 70 which is now in the path of arm 52, as will be seen from inspection of FIG. 8. Thus the initial stroke of arm 52 acting on cam 70 retracts sleeve 68 to the position of FIG. 3, which may be termed the normal operating position of the sleeve, and frees fulcrum 66 for its oscillatory movement as just described.

When door 21 reaches the end of its travel and is fully closed, or if for any other reason during the closing movement it should be stopped or substantially slowed down, this change in speed of the door is reflected in a corresponding change in the speeds of sprocket 46 and disc 45 relative to each other. Since it is the latter member that provides the biasing torque on arm 52, a change in rotational speed of driven disc 45 has a similar effect on the biasing torque applied to arm 52; and when this biasing torque falls below a certain predetermined value because of a slowdown in the speed of disc 45 relative to disc 38 and, more especially, to cam 37, the arm is not driven counterclockwise fast enough to maintain continuous contact with cam 70. When arm 52 loses its counterclockwise bias, it remains at the upper end of its oscillatory movement at a point to which it is carried by the upward movement of fulcrum 66 because without the bias, there is no force tending to move the arm downwardly. Consequently, downward movement of fulcrum 66 relative to the arm by cam 37, which continues to rotate, now disengages cam 70 and allows the sleeve 68 to slide outwardly along the pin 66 under the influence of spring 69 until the sleeve again enters opening **22*a* in side plate 22. Contact with side plate 22 is on the downward movement of fulcrum 66 so that contact in this instance is at the lower edge of opening 22*a* and acts to stop further movement of fulcrum 66**.

Contact of the fulcrum with side plate 22 fixes the fulcrum in space, causing operating lever 60 to swing about the now fixed axis of fulcrum 66. This causes fulcrum 62 to move from the position **62*a* back to the solid line position 62 of FIG. 5. Fulcrum 62 being attached to the secondary operating lever 78, lever 78 is now rocked in a clockwise direction around pivot 79. Movement of the secondary operating lever shifts the switch handle from the position 76*a* to the full line position 76, breaking the energizing circuit to motor 10 and thus causing motor 10** to stop.

It will be apparent from the foregoing description that various changes in the specific details and construction of the various elements constituting the present invention may be made without departing from the spirit and scope of the present invention. For example, although friction clutches have been shown as a suitable and economical type of clutch, it will be appreciated that other types of slip clutches, such as magnetic clutches, may be employed if desired. Likewise, the mechanism for sensing the change in speed is not necessarily limited to a combination with a door and an electric motor; but the secondary arm 78 may be a means for actuating any suitable type of control mechanism controlling the operation of a prime mover. Accordingly, it is to be understood that the foregoing description is considered as being illustrative of, rather than limitative upon, the invention as defined by the appended claims.

I claim:

1. Mechanism for sensing a change in relative speed of a driven member, comprising:
- a driving member;
- a driven member;
- friction clutch means for driving said driven member from said driving member while permitting relative slippage between elements of the clutch means whereby the driven member can slow down relative to the driving member;
- a cam;
- means driving said cam;
- an operating lever engaging said cam to be rocked thereby;
- a pair of fulcrums rockably engaging said lever, one of said fulcrums being normally stationary but shiftable between two positions and the other of said fulcrums being on and movable with the lever;
- and means to hold said other fulcrum fixed in space to shift the one fulcrum between said positions in response to a decrease in the speed of the driven member relative to the driving member.

2. Mechanism for sensing a change in relative speed of a driven member as in claim 1 in which the driving and driven members are rotatable members coaxially mounted.

3. Mechanism for sensing a change in relative speed of a driven member as in claim 2 in which the eccentric cam is rotatably mounted coaxially with and is driven by the driven member.

4. Mechanism for sensing a change in relative speed of a driven member as in claim 1 in which the last-mentioned means includes:
- a fixed stop;
- and stop-engaging means carried by said other fulcrum and movable into engagement with the fixed stop in response to a decrease in the speed of the driven member relative to the driving member to hold the other fulcrum stationary.

5. Mechanism for sensing a change in relative speed of a driven member as in claim 1 in which the last-mentioned means includes
- a fixed stop;
- a movable member carried by said other fulcrum and biased to a position in which the movable member engages the fixed stop;
- and means operable to retract said movable member to a position out of engagement with the fixed stop;
- the retracting means operating in response to movement of the driven member and becoming inoperative upon a decrease in the speed of the driven member relative to the driving member.

6. Mechanism for sensing a change in relative speed of a driven member as in claim 1 in which the last-mentioned means includes
- a fixed stop;
- a movable member carried by said other fulcrum and biased to a position in which the movable member engages the fixed stop;
- an arm swingingly mounted and operable to retract said movable member;
- and a friction clutch between the driven member and the arm biasing said arm to a retracting position in response to movement of the driven member but permitting relative slippage between the arm and the driven member;
- said arm losing its bias upon a decrease in the speed of the driven member relative to the driven member and becoming inoperative to hold the movable member out of engagement with the fixed stop.

7. Mechanism for sensing a change in relative speed of a driven member as in claim 1 which also includes
- a prime mover drivingly connected to the driving member;
- and control means controlling operation of said prime mover, said control means being actuated by the shifting movement of said one fulcrum.

8. Mechanism for sensing a change in relative speed of a driven member as in claim 1 that also includes
- an electric motor drivingly connected to the driving member;
- switch means controlling operation of the motor;
- and a second operating lever movable about a fixed axis and operating the switch means;
- said one fulcrum interconnecting both operating levers to actuate the switch means when the one fulcrum shifts between said positions.

9. Mechanism for sensing a change in relative speed of a driven member, comprising:
- a rotary driving member;
- a rotary driven member;

friction clutch means for driving said driving member from said driven member while permitting relative slippage between elements of said clutch means whereby there can take place a change in relative speed of said driving and driven members;

a rotary cam;

means connecting the cam to the driving member for rotation therewith;

an operating lever engaging the cam to be rocked thereby;

a first fulcrum engaging said lever to establish a first axis about which the lever can rock, said fulcrum being normally stationary but shiftable between two positions;

a second fulcrum carried by and movable with the lever and establishing a second axis about which the lever can rock, said axis being located between the first axis and the eccentric cam so that the second fulcrum oscillates;

and means operative in response to a decrease in the rotational speed of the driven member relative to the driving member to hold the second fulcrum fixed to rock the lever about the second axis and shift the first fulcrum between said two positions.

10. Mechanism for sensing a change in relative speed of a driven member as in claim 9 in which the means for holding the second fulcrum includes a fixed stop;

and means carried by the second fulcrum for engaging the fixed stop and movable into engagement with the stop in response to a decrease in speed of the driven member relative to the driving member to hold the second fulcrum stationary and shift the first fulcrum.

11. Mechanism for sensing a change in relative speed of a driven member as in claim 9 in which the means for holding the second fulcrum includes a fixed stop;

a member carried by and slidable relative to the second fulcrum;

means biasing the slidable member to a position in which it engages the fixed stop;

and means operable to retract said slidable member in opposition to the biasing means from said stop-engaging position;

said retracting means being operable in response to rotational movement of the driven member and becoming inoperative upon a decrease in the rotational speed of the driven member relative to the rotational speed of the driving member.

12. Mechanism for sensing a change in relative speed of a driven member as in claim 9 in which the means for holding the second fulcrum includes a fixed stop;

a member carried by and slidable relative to the second fulcrum;

means biasing the slidable member to a position in which it engages the fixed stop;

an arm mounted to swing about the axis of rotation of the driven member and engageable with said slidable member to retract the slidable member in opposition to the biasing means from said stop-engaging position;

and a friction clutch biasing the arm into retracting engagement with the slidable member in response to rotation of the driven member but permitting relative slippage between the arm and the driven member;

said arm losing its bias upon a decrease in the rotational speed of the driven member and thereupon becoming inoperative to retract the slidable member from engagement with the fixed stop.

13. Mechanism for sensing a change in relative speed of a driven member as in claim 12 in which the second fulcrum is a pin and the slidable member is a sleeve thereon spring biased to an extended position, and which also includes cam means on the sleeve engaged by said arm to move the sleeve against the spring.

14. Mechanism for sensing a change in relative speed of a driven member, comprising:

a driven assembly including a shaft carrying a first disc attached thereto;

a driving assembly rotatable about the shaft and including a cam and a second disc;

friction clutch means maintaining a power transmitting relation between the first and second discs but allowing relative slippage of the discs and a change in relative speed of said two assemblies;

an arm mounted to swing about the shaft;

a second friction clutch means maintaining a torque transmitting relation between the first disc and said arm whereby the arm is urged to rotate with the driven assembly, said second clutch means permitting relative slippage between the arm and first disc;

an operating lever engaging and oscillated by said cam;

a first fulcrum establishing a normally stationary axis about which the lever oscillates, said axis being shiftable between two positions;

a second fulcrum carried by the arm to oscillate therewith;

and means operable to hold the second fulcrum against oscillation and thereby cause the operating lever to shift the normally stationary fulcrum from one position to the other;

said arm rendering the last-mentioned means inoperative during rotation of the driven assembly.

15. Mechanism for sensing a change in relative speed of a driven member as in claim 14 in which the last-mentioned means includes a fixed stop;

and a stop-engaging element carried by the second fulcrum and normally urged into engagement with the fixed stop;

said arm holding the element away from a stop-engaging position during rotation of the driven assembly and releasing the element upon a decrease in rotational speed of the driven member relative to the rotational speed of the driving member.

16. Mechanism for sensing a change in relative speed of a driven member as in claim 14 in which the last-mentioned means includes a fixed stop;

an element slidably carried by the second fulcrum and normally urged to an extended position in which the element engages the fixed stop;

and a cam on the slidable element;

said arm being urged during rotation of the driven assembly into engagement with the cam to retract the element from stop-engaging position and disengaging the cam upon a decrease in rotational speed of the driven member relative to the rotational speed of the driving member.

References Cited

UNITED STATES PATENTS

| | | | |
|---|---|---|---|
| 2,386,706 | 10/1945 | Moessinger | 192—150 X |
| 2,551,825 | 5/1951 | Cook | 192—150 X |

ORIS L. RADER, *Primary Examiner.*

B. A. COOPER, *Assistant Examiner.*